United States Patent [19]  
Finch

[11] 3,715,491  
[45] Feb. 6, 1973

[54] TELEVISION CAMERA TUBE COOLING ARRANGEMENTS
[75] Inventor: Derek James Finch, Essex, England
[73] Assignee: The Marconi Company Limited, London, England
[22] Filed: March 8, 1971
[21] Appl. No.: 121,767

[30] Foreign Application Priority Data

March 14, 1970 Great Britain.....................12,396/70

[52] U.S. Cl.................178/7.2, 178/DIG. 14, 313/44, 313/46
[51] Int. Cl...........................................H04n 5/26
[58] Field of Search.............178/DIG. 14; 313/44, 46

[56] References Cited

UNITED STATES PATENTS 3,126,498   3/1964   Bendell.........................178/DIG. 14

Primary Examiner—Robert L. Griffin
Assistant Examiner—George G. Stellar
Attorney—Baldwin, Wight & Brown

[57] ABSTRACT

A camera tube cooling arrangement has a body of good thermal conductivity and low dielectric constant mounted in good thermal contact with the face plate of the camera tube and outside the image area of the camera tube. The body is cooled by a thermo-electric cooling unit which is mounted with its cold face in thermal contact with the body and its hot face in thermal contact with a finned heat sink.

8 Claims, 1 Drawing Figure

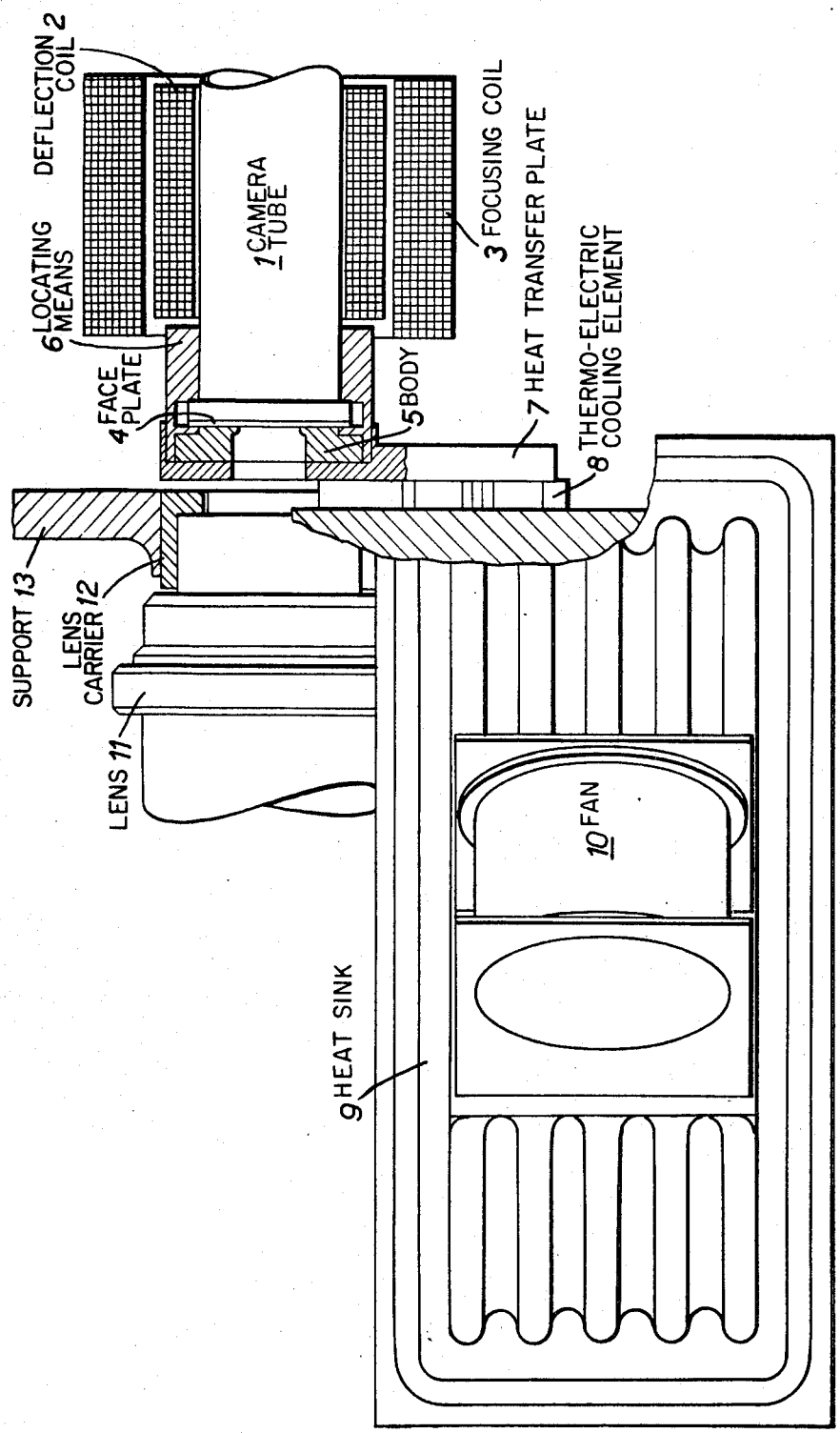

TELEVISION CAMERA TUBE COOLING ARRANGEMENTS

This invention relates to television cameras and to television camera tube cooling arrangements therefor.

In some cases it is necessary to operate television camera tubes at a particular working temperature which is lower than the tubes would ordinarily attain — it may be lower than the surrounding ambient temperature — and with the television cameras in relatively inaccessible locations, e.g. at the top of a mast. This necessity may arise, for example, in the case of Vidicon tubes operated in exposed environments where, unless special means are provided to prevent it, a combination of high ambient temperature, internal heating of the tubes and solar radiation may result in the tubes reaching a temperature at which there is significantly degraded tube performance. In such cases the provision of means for cooling the photoconductive layers of the tubes becomes necessary in practice.

If the cameras are in readily accessible places, conventional cooling methods using vapor-compression refrigeration techniques may be employed, a vapor compression unit being used to cool air or another fluid which in turn is used to cool the camera tube. However, if the tubes are in inaccessible positions it is often inconvenient or even impractical to have to duct cooled fluid to the tubes. It may also be undesirable to have a liquid, with consequent risk of leakage, near expensive electronic equipment. Moreover the positioning of bulky vapor-compression units near the tubes is often likely to be inconvenient or impractical.

The present invention seeks to provide improved television camera tube cooling arrangements which may be employed with cameras mounted inaccessible places and which avoid the need to duct a fluid to the camera tubes.

According to this invention a camera tube cooling arrangement includes a body of good thermal conductivity and low dielectric constant adapted to contact with the face plate of the camera tube at a region or regions outside the image area thereof; a thermo-electric cooling unit which, when in use, has its cold face thermally connected to said body; and means for cooling the hot face of said thermo-electric cooling unit.

By a body of good thermal conductivity is meant a body having a thermal conductivity similar to or approaching that of a metal body. By a body of low dielectric constant is meant a body having a dielectric constant and dimensions such that the operation of the camera tube is substantially unaffected by the presence of said body or by the presence of a metal or potential on a surface of the body opposite to that which contacts with the faceplate of the tube.

Preferably the body of good thermal conductivity and low dielectric constant is thermally connected to the thermo electric cooling unit via a heat transfer plate. A suitable material for the body of good thermal conductivity and low dielectric constant is boron nitride. The metal plate may be made of aluminum.

Preferably means for cooling the hot face of the thermoelectric cooling unit is a finned metal plate. A fan is preferably provided to blow air over the finned metal plate.

The thermo-electric cooling unit may comprise a plurality of individual thermo-electric cooling elements connected thermally in parallel and electrically in series. Suitable elements are, for example, sold under the trade name of Fregistor.

The invention is illustrated in and described by way of example with reference to the accompanying drawing which is a schematic sectional view of part of a camera tube cooling arrangement in accordance with this invention. Only parts of the arrangement necessary for a ready understanding of the invention are shown. Those parts not shown may be of any convenient and appropriate form.

Referring to the drawing, there is partially shown a camera tube (which is a Vidicon in the present case) round which are the customary deflection and focusing coils 2 and 3 respectively, and having a face plate 4. The cooling arrangement for the tube comprises a body 5 of a material having good thermal conductivity and low dielectric constant, such as boron nitride, mounted in good thermal contact with the face plate 4 by locating means 6. The body 5 is annular and surrounds the useful image area of the face plate 4. Over the body 5 is an apertured heat transfer aluminum plate 7, which is in good thermal contact therewith, and the aperture in which is such that the metal is all outside the useful image area of the faceplate. A thermo-electric cooling unit comprising a number of thermo electric elements 8 is mounted with the cold face thereof in thermal contact with the aluminum plate 7 and a finned heat sink 9 is mounted in good thermal contact with the hot face of the thermo electric cooling unit. A fan 10 is provided to blow air over the fins of the heat sink 9.

A lens 11 is mounted in a lens carrier 12 on a support 13 in front of the faceplate 4.

In operation with a constant voltage applied (by means not shown) across the thermo electric elements reductions in temperature of the hot faces thereof will be accompanied by associated reductions in temperature of the cold faces. Thus if the hot faces of the thermo electric elements rise to temperatures above the ambient air temperature they may be cooled by ambient air forced on to the heat-sink 9 by the fan 10 and the temperatures of the cold faces of the thermo electric elements 8 will be correspondingly lowered. Accordingly, the metal plate 7, the boron nitride member 5 and the face plate 4 will in turn be cooled.

The signal/noise ratio of the video signal obtained from a Vidicon is dependent on the total value of stray capacity between the tube signal electrode and earth. By choosing a material with a suitably high thermal conductivity and a suitably low dielectric constant for the member 5 in contact with the glass faceplate of the Vidicon an efficient transfer of heat with only a small increase in the stray capacitance of the signal plate electrode may be achieved. Cooling is therefore obtained without causing substantial degradation of the video/noise ratio.

Cameras with cooling arrangements as illustrated can conveniently be used in inaccessible positions for there is no need for ducted cooling fluid; all that is necessary being to provide a small amount of electrical power via supply leads for the arrangement.

I claim:

1. A camera tube cooling arrangement including a body of good thermal conductivity and low dielectric constant in substantially below that of copper contact with the face plate of the camera tube at a region or regions outside the image area thereof; a thermo-electric cooling unit which, when in use, has its cold face thermally connected to said body; and cooling means for cooling the hot face of said thermo-electric cooling unit.

2. An arrangement as claimed in claim 1 wherein the body of good thermal conductivity and low dielectric constant is thermally connected to the thermo electric cooling unit via a heat transfer plate.

3. An arrangement as claimed in claim 2 wherein the body of good thermal conductivity and low dielectric constant is boron nitride.

4. An arrangement as claimed in claim 2 wherein said heat transfer plate is metallic.

5. An arrangement as claimed in claim 4 wherein said heat transfer plate comprises aluminum.

6. An arrangement as claimed in claim 1 wherein the means for cooling the hot face of the thermoelectric cooling unit is a finned metal plate.

7. An arrangement as claimed in claim 6 wherein a fan is provided to blow air over the finned metal plate.

8. An arrangement as claimed in claim 1 wherein said body comprises boron nitride.

* * * * *